(12) United States Patent
Hirose

(10) Patent No.: US 11,658,539 B2
(45) Date of Patent: May 23, 2023

(54) ELECTRIC MOTOR WITH CIRCUIT BOARD BEING HELD BY INSULATOR

(71) Applicant: SHINANO KENSHI KABUSHIKI KAISHA, Nagano (JP)

(72) Inventor: Yo Hirose, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 76 days.

(21) Appl. No.: 17/324,189

(22) Filed: May 19, 2021

(65) Prior Publication Data
US 2022/0014069 A1    Jan. 13, 2022

(30) Foreign Application Priority Data

Jul. 10, 2020  (JP) .............................. JP2020-119028

(51) Int. Cl.
*H02K 3/32* (2006.01)
*H02K 5/22* (2006.01)
*H02K 11/33* (2016.01)
*H02K 5/10* (2006.01)

(52) U.S. Cl.
CPC .............. *H02K 5/10* (2013.01); *H02K 3/325* (2013.01); *H02K 5/225* (2013.01); *H02K 11/33* (2016.01); *H02K 2211/03* (2013.01)

(58) Field of Classification Search
CPC ............ H02K 3/32; H02K 3/325; H02K 3/34; H02K 3/345; H02K 5/225; H02K 11/30; H02K 11/33; H02K 2203/03; H02K 2203/09; H02K 2203/12; H02K 2211/03
See application file for complete search history.

(56) References Cited

U.S. PATENT DOCUMENTS

| | | | |
|---|---|---|---|
| 2013/0169086 A1* | 7/2013 | Chai ........................ | H02K 3/28 310/71 |
| 2015/0214811 A1* | 7/2015 | Nishidate ................. | H02K 5/22 310/68 B |
| 2017/0302127 A1* | 10/2017 | Sakuragi .................. | H02K 5/04 |

FOREIGN PATENT DOCUMENTS

JP           2018137990          8/2018

\* cited by examiner

*Primary Examiner* — Eric Johnson
(74) *Attorney, Agent, or Firm* — Stephen J. Weyer, Esq.; Stites & Harbison, PLLC

(57) ABSTRACT

Insulators each include a plurality of board holding claws projecting from an outer peripheral edge of the circuit board for engaging a plurality of board recesses, the plurality of board holding claws are arranged on the outer peripheral edge of the circuit board such that an interval of board holding claws on a connector-mounted side is smaller than an interval between board holding claws on a counter-connector-mounted side, and a load receiving pin, which receives a radial load, projects at a counter-connector-mounted position, which is opposite to a mounted position of a connector.

3 Claims, 3 Drawing Sheets

ELECTRIC MOTOR WITH CIRCUIT BOARD BEING HELD BY INSULATOR

CROSS-REFERENCE TO RELATED APPLICATION

This application is based upon and claims the benefit of priority of the prior Japanese Patent Application No. 2020-119028, filed on Jul. 10, 2020, and the entire contents of which are incorporated herein by reference.

TECHNICAL FIELD

The present invention relates to, for example, an electric motor including a circuit board held in an insulator, which is mounted on a stator core.

BACKGROUND ART

For example, a motor 51 of an inner rotor type illustrated in FIG. 3A includes a stator 53 assembled in a motor case 52, and a rotor 54 including a rotor shaft 54*a*. The rotor shaft 54*a* is rotatably supported by rolling bearings 55 assembled to the motor case 52. The stator 53 includes a stator core 53*a*, insulators 56, and coils 57. The stator core 53*a* includes an annular back yoke and a plurality of pole teeth projecting radially from the back yoke at predetermined intervals, the insulators 56 are attached to the pole teeth from both sides in an axial direction, and the coils 57 is wound around the insulators 56. A circuit board 59 having a wiring pattern for supplying power to the coils 57 is held by the insulator 56 on a counter-output side. The circuit board 59 includes a connector 58 mounted thereon, and the connector 58 is connected to a terminal of external connection wiring, not illustrated, and receives a supply of power.

As illustrated in FIG. 3B, the circuit board 59 includes board recesses 59*a* on an outer peripheral edge thereof at positions of line symmetry (with a center angle θ) to a direction of insertion of a connector (direction indicated by an arrow). The circuit board 59 is held by board holding claws 56*a*, which project from the insulator 56 at positions corresponding to the board recesses 59*a* and engage the board recesses 59*a*. As illustrated in FIG. 3A, the connector 58, which is mounted on the circuit board 59, is disposed to be exposed outward from an outer peripheral surface of the motor case 52 to allow wiring connection with the external connection wiring, not illustrated.

Patent Literature 1 discloses a motor having a configuration in which a circuit board, which has a connector, is fixed to an insulator. The motor obtains a driving current through the connector. An outer peripheral surface of the circuit board includes notches, which are depressed radially inward from an outer periphery. Engaging portions, which project from the insulator and have a hooked end, are inserted respectively into the notches formed on the outer peripheral surface of the board. Part of each notch is enlarged and used for leading a coil wire out.

CITATION LIST

Patent Literature

PTL 1: JP-A-2018-137990

SUMMARY OF INVENTION

Technical Problem

The circuit board 59 is held by the board holding claws 56*a*, formed at positions of line symmetry to a direction of insertion of the connector 58 (direction indicated by an arrow), as illustrated in FIG. 2B. In this case, connecting a terminal of the external connection wiring to the connector 58 causes a load acting on the circuit board 59 radially from a connector-mounted side to a counter-connector-mounted side on the opposite side. In this situation, the load may act on the board holding claws 56*a*, which hold the circuit board 59 in an equiangular arrangement, in a radial direction, and bend or break the board holding claws 56*a*.

Providing the board holding claws 56*a* at the positions of line symmetry to the connector insertion direction may cause mounting 180 degrees in a wrong orientation when assembling the circuit board 59 to the insulator 56.

For example, in the case of a three-phase six-slot motor in delta connection, V-shaped guide grooves 60, formed in equiangular arrangement on an outer peripheral edge of the circuit board 59 for guiding a coil wire at a winding start position and a winding end position of the coil 57, may overlap with the board recesses 59*a* for engaging the board holding claws 56*a*, as illustrated in FIG. 2B. Therefore, it may take a long time to route the coil wire on the circuit board 59.

Solution to Problem

In response to the above issue, one or more aspect of the present invention are directed to an electric motor configured to prevent deformations and damages of board holding claws, which may be caused by insertion and removal of a terminal of external connection wiring into and from a connector, avoid orientational misalignment when assembling a circuit board, and furthermore, and eliminate interference between an engaging position of the board holding claws and guide grooves for a coil wire, which facilitates a wiring process.

The disclosure relating to some embodiments described below includes at least the following configurations. An electric motor includes a stator core including an annular back yoke and a plurality of pole teeth projecting radially from the back yoke at predetermined intervals, the stator core including insulators attached to the pole teeth from both sides in an axial direction, and a circuit board including the connector mounted thereon, the circuit board being held by the insulator, the insulators each include a plurality of board holding claws projecting from an outer peripheral edge of the circuit board for engaging a plurality of board recesses, the plurality of board holding claws are arranged on the outer peripheral edge of the circuit board such that an interval on a connector-mounted side is smaller than an interval between the board holding claws on a counter-connector-mounted side, and a load receiving member, which receives a radial load, projects from the circuit board at a counter-connector-mounted position, which is opposite to a connector-mounted position.

The electric motor as described above receives a radial load by a load receiving member, which is provided at the counter-connector-mounted position, when the terminal of the external connection wiring is inserted into the connector, and receives the radial load by the board holding claws provided at a narrow interval on the connector-mounted side when the terminal of the external connection wiring is pulled out from the connector. This prevents deformations and damages of the board holding claws.

The interval between the board holding claws on the connector-mounted side is smaller than the interval between the board holding claws on the counter-connector-mounted side. This prevents assembly of the circuit board in a wrong orientation by 180 degrees.

In addition, making the interval between the board holding claws on the connector-mounted side narrower than the interval between the board holding claws on the counter-connector-mounted side eliminates interference with the guide grooves for the coil wire at a winding start position and a winding end position of the coil, so that the wiring process is facilitated.

In some embodiments, the outer peripheral edge of the circuit board includes board recesses to engage the board holding claws and a board notch to allow the load-receiving member to fit.

This makes it possible to align and assemble the circuit board with the insulator by making the plurality of board holding claws engage with the board recesses and fitting the load-receiving member to the board notch.

The circuit board may include a plurality of the guide grooves for guiding the coil wire at the winding start position or the winding end position of the coil wound around the insulators, which cover stator pole teeth, at a position not interfering with the board holding claws.

As described above, the plurality of guide grooves for the coil wire are provided at positions avoiding interference with the board holding claws. This avoids mutual interference between the board recesses for engaging the board holding claws and the guide grooves for the coil wire on the outer peripheral edge of the circuit board.

The plurality of board holding claws may be provided on the outer peripheral edge of the circuit board at positions of line symmetry to a connector insertion direction and may be provided so that the intervals between the board holding claws on the connector-mounted side are smaller than the intervals between the board holding claws on the counter-connector-mounted side.

This prevents deformations or damages of the board holding claws at the time of insertion and removal of the terminal of the external connection wiring into and from the connector and eliminates the probability of assembly of the circuit board in a wrong orientation.

Advantageous Effects of the Invention

The aspect of the present invention may provide an electric motor configured to prevent deformations and damages of board holding claws at the time of insertion and removal of a terminal of the external connection wiring into and from the connector, eliminates the probability of assembly of the circuit board in a wrong orientation, and eliminates interference between a position of the board holding claws on the insulator and a position of guide grooves on the circuit board for coil wiring, so that easy wiring process is achieved.

DESCRIPTION OF EMBODIMENT

Referring now to the attached drawings, an embodiment of an electric motor according to the present invention will be described below. Schematic configuration of an inner rotor type motor as an example of the electric motor will be described with reference to FIG. 1A.

Figure 1A:
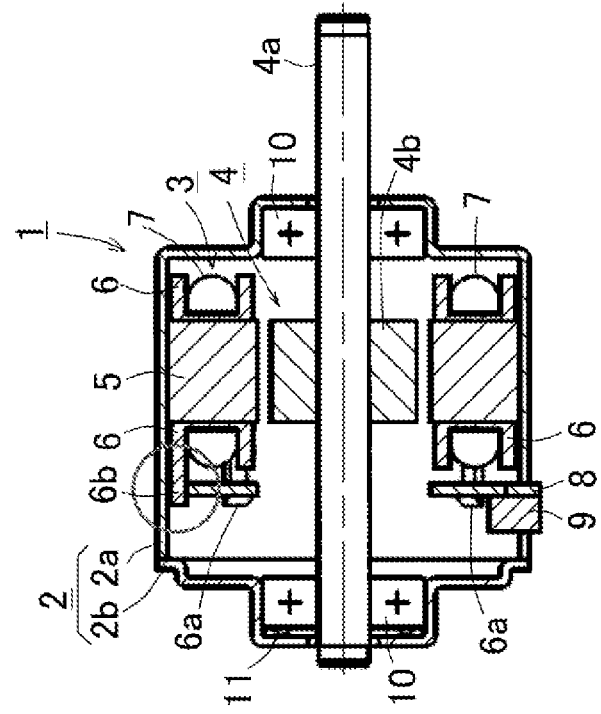
FIG. 1A is a cross-sectional view of a motor taken along an axial direction.

In FIG. 1A, a motor 1 has the following configuration. A motor case 2 includes a case body 2a and a rear cover 2b. The motor case 2 is made of a metal material, such as a galvanized steel sheet. The motor case 2 contains therein a stator 3 and a rotor 4.

The stator 3 is assembled with a stator core 5 being press-fitted into the case body 2a with the rear cover 2b removed. The stator core 5 includes an annular back yoke having a plurality (six in a case of a three-phase slot) of pole teeth projecting radially toward a center at predetermined intervals (at every 60 degrees in a circumferential direction). A laminated core including a plurality of transposed electromagnetic steel plates is used as the stator core 5. The pole teeth of the stator core 5 are covered with the insulators 6, which are mounted on both sides in an axial direction, and a coil 7 is wound around the pole teeth via the insulators 6. For example, a PBT (polybutylene terephthalate) resin or the like is used for the insulators 6. A circuit board 8 having a wiring pattern for supplying power to the coil 7 is held on the insulator 6 on a counter-output side. A connector 9 is mounted on the circuit board 8, and the connector 9 is connected to a terminal of external connection wiring, not illustrated, and receives a supply of power.

In FIG. 1A, the rotor 4 includes a rotor magnetic pole 4b assembled integrally around a rotor shaft 4a. The rotor shaft 4a is rotatably supported by rolling bearings 10 assembled respectively to the case body 2a and the rear cover 2b, which constitute the motor case 2. The rotor magnetic pole 4b is assembled to face magnetic flux acting surfaces of the pole teeth of the stator core 5. Note that the rolling bearing 10 provided in the rear cover 2b may be preloaded toward an output side in the axial direction by a preload spring 11.

Figure 2A:
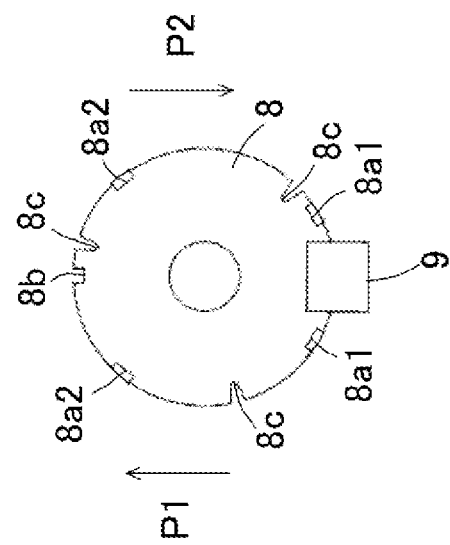
FIG. 2A is a plan view illustrating an arrangement of the circuit board and board holding claws.
Figure 2B:
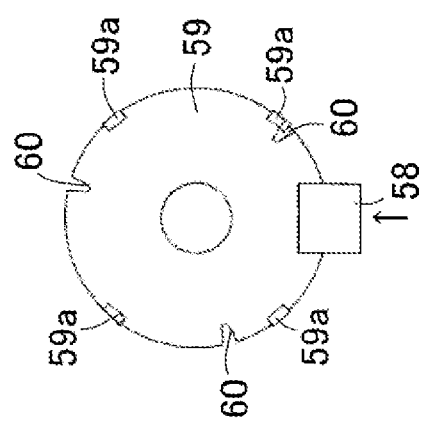
FIG. 2B is a plan view illustrating an arrangement of a circuit board and board holding claws of the related art.
Figures 3A, 3B:
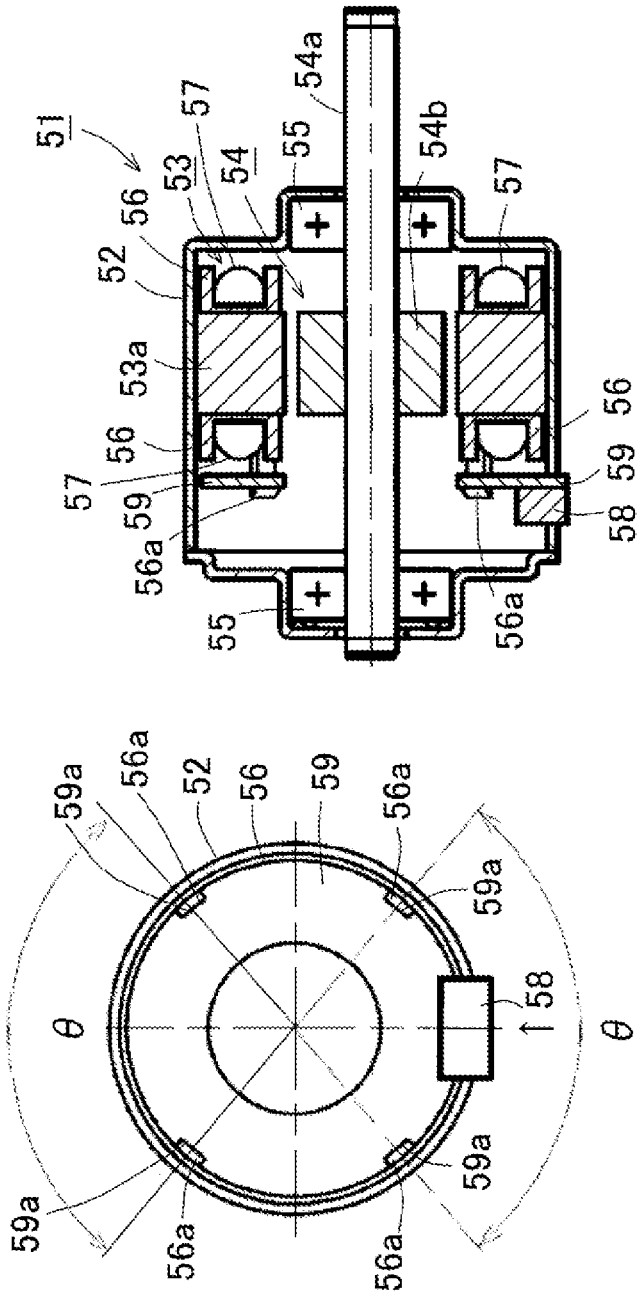
FIG. 3A is a cross-sectional view of a motor of the related art taken along an axial direction.
FIG. 3B is a right side view of an insulator holding a circuit board in FIG. 3A.

The insulator 6 on the counter-output side includes a plurality of board holding claws 6a projecting therefrom. The board holding claws 6a are provided at four positions as illustrated in FIG. 2A, such that those on a connector-mounted side are provided at different intervals from those on a counter-connector-mounted side. The circuit board 8 includes a plurality of board recesses 8a (8a1, 8a2) provided on an outer peripheral edge thereof. The board holding claws 6a each include hook-shaped claws at an end thereof, and the hook-shaped claws are engaged in the board recesses 8a by a snap-fit. The circuit board 8 is assembled to the insulator 6 with each of the board holding claws 6a engaging the board recesses 8a. The board recesses 8a are also provided at different intervals between the connector-mounted side and the counter-connector-mounted side, such as at four positions on the outer peripheral edge of the circuit board 8 as illustrated in FIG. 2A.

Figure 1B:
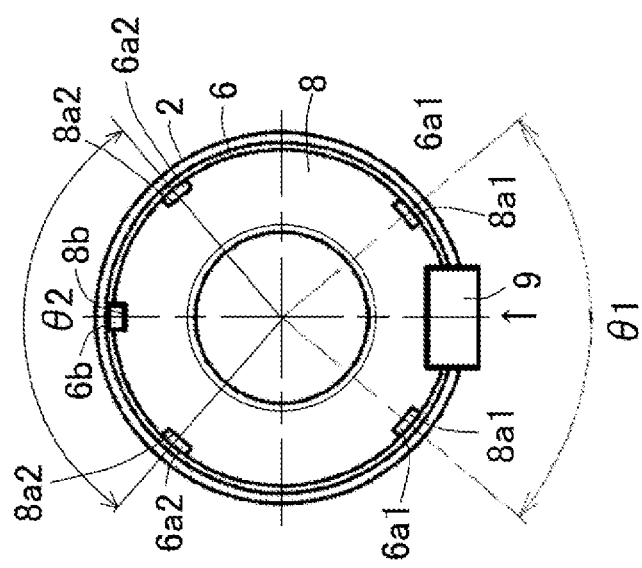
FIG. 1B is a right side view of an insulator holding a circuit board in FIG. 1A.

As illustrated in FIG. 1B, the plurality of board holding claws 6a are provided on the outer peripheral edge of the circuit board 8 at positions of line symmetry to a direction of insertion of a connector (direction indicated by an arrow), and intervals between the board holding claws 6a1 on the connector-mounted side are smaller than intervals between the board holding claws 6a2 on the counter-connector-mounted side. Specifically, while the board holding claws $6a2$ on the counter-connector-mounted side are formed at an interval having a central angle $\theta2$, the board holding claws $6a1$ on the connector-mounted side are formed at an interval having a central angle $\theta1$, which is smaller than $\theta2$ ($\theta2>\theta1$), that is, are formed at positions near the connector 9. A load receiving pin 6b (load-receiving member), which receives a radial load, is provided on the circuit board 8 at a counter-connector-mounted position, which is opposite to a connector 9 mounted position. The load receiving pin 6b is configured to be fitted to a board notch 8b provided on the circuit board 8 on the outer peripheral edge (See FIG. 2A). The outer peripheral edge of the circuit board 8 also includes V-shaped guide grooves 8c at three points in an equiangular arrangement to guide a coil wire at a winding start position and a winding end position of the coil 7. The positions of the guide grooves 8c correspond to positions where the coil wire is held in a three-phase delta connection.

As illustrated in FIG. 2A, the motor 1 as described above shares the load acting radially when inserting the terminal of the external connection wiring into the connector 9 in a direction indicated by an arrow P1 by the load-receiving pin 6b, which is provided at the counter-connector-mounted position, and the board holding claws 6a2, which are provided on both sides of the load-receiving pin 6b. When the terminal of the external connection wiring is pulled out from the connector 9 in a direction indicated by an arrow P2, the board holding claws 6a1 provided at a narrow interval on the connector 9 mounted side receive the radial load. This prevents deformations and damages of the board holding claws 6a (6a1, 6a2).

The interval between the board holding claws 6a1 on the connector-mounted side is smaller than the interval between the board holding claws 6a2 on the counter-connector-mounted side. This prevents assembly of the circuit board 8 in a wrong orientation by being rotated by 180 degrees.

In addition, making the interval between the board holding claws 6a1 on the connector-mounted side narrower than the interval between the board holding claws 6a2 on the counter-connector-mounted side eliminates interference with the guide grooves 8c that guide the coil wire at an engaging position of the board holding claws 6a and the winding start position and the winding end position of the coil 7, and also eliminates the interference of the board recesses 8a (8a1, 8a2), which are engaged by the board holding claws 6a (6a1, 6a2) with the guide grooves 8c, so that the wiring process is facilitated.

In the embodiment described above, the inner rotor type motor has been illustrated as an example of the electric motor. However, an outer-rotor type motor including the circuit board on the insulator is also applicable. The number of board holding claws 6a and the board recesses 8a for holding the circuit board 8 has been described by four, but more than four is also applicable.

The three-phase delta connection has been described as a coil connection. However, a three-star connection is also applicable.

What is claimed is:
1. An electric motor comprising:
    a stator core including an annular back yoke and a plurality of pole teeth projecting in a radial direction from the back yoke at predetermined intervals, the stator core including insulators attached to the pole teeth from both sides in an axial direction, and
    a circuit board including a connector mounted thereon, the circuit board being held by the insulator on a counter-output side,
    wherein the insulator on the counter-output side includes a plurality of board holding claws projecting from an outer peripheral edge of the circuit board for engaging a plurality of board recesses,
    the plurality of board holding claws are provided at positions of line symmetry to a connector insertion direction on the outer peripheral edge of the circuit board,
    the plurality of board holding claws are arranged on the outer peripheral edge of the circuit board such that the board holding claws on a connector-mounted side are formed at an interval having a central angle $\theta1$, and that the board holding claws on a counter-connector-mounted side are formed at an interval having a central angle $\theta2$, $\theta1$ is smaller than $\theta2$, and a load receiving member, which receives a radial load, projects from the circuit board at a counter-connector-mounted position, which is opposite to a connector-mounted position.
2. The electric motor according to claim 1, wherein the outer peripheral edge of the circuit board includes the board recesses with which the board holding claws engage and a board notch into which the load-receiving member fits.
3. The electric motor according to claim 1, wherein the circuit board includes a plurality of guide grooves for guiding a coil wire at a winding start position or a winding end position of a coil wound around the insulators, which covers stator pole teeth at a position not interfering with the board holding claws.

* * * * *